United States Patent
Arakawa et al.

(10) Patent No.: US 11,654,721 B2
(45) Date of Patent: May 23, 2023

(54) TIRE

(71) Applicant: Sumitomo Rubber Industries, Ltd., Kobe (JP)

(72) Inventors: Saki Arakawa, Kobe (JP); Hiroshi Yamaoka, Kobe (JP); Kotaro Tahara, Kobe (JP); Takafumi Noguchi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 339 days.

(21) Appl. No.: 16/880,472

(22) Filed: May 21, 2020

(65) Prior Publication Data
US 2020/0376896 A1 Dec. 3, 2020

(30) Foreign Application Priority Data

May 31, 2019 (JP) .............................. JP2019-102091
May 31, 2019 (JP) .............................. JP2019-102096
May 31, 2019 (JP) .............................. JP2019-102097

(51) Int. Cl.
*B60C 11/03* (2006.01)

(52) U.S. Cl.
CPC ...... *B60C 11/0302* (2013.01); *B60C 11/0304* (2013.01); *B60C 2011/0372* (2013.01); *B60C 2011/0374* (2013.01)

(58) Field of Classification Search
None
See application file for complete search history.

(56) References Cited

U.S. PATENT DOCUMENTS

2012/0318419 A1* 12/2012 Iwabuchi ............ B60C 11/0304
152/209.8

FOREIGN PATENT DOCUMENTS

| DE | 102007044435 A1 | 3/2009 | |
|---|---|---|---|
| EP | 2154008 A1 | 2/2010 | |
| EP | 2540526 A1 | 1/2013 | |
| EP | 3078507 A1 * | 10/2016 | ......... B60C 11/0302 |
| JP | 6-48120 A | 2/1994 | |
| JP | 2006-76338 A | 3/2006 | |
| JP | 2012-218596 A | 11/2012 | |
| JP | 2015-120380 A | 7/2015 | |

OTHER PUBLICATIONS

Extended European Search Report, dated Jul. 22, 2020, for European Application No. 20174130.3.

* cited by examiner

*Primary Examiner* — Yung-Sheng M Tsui
(74) *Attorney, Agent, or Firm* — Birch, Stewart, Kolasch & Birch, LLP (57) ABSTRACT

A tire comprises a tread portion having outboard and inboard tread edges and provided with three main grooves to axially divide the tread portion into four land regions including a widest outboard middle land region, wherein first inclined grooves (16) extend across the entire width of the outboard middle land region; second inclined grooves (17) extend from a crown main groove and are terminated within the outboard middle land region; fourth inclined grooves (19) are connected to the second inclined grooves (17) and to the first inclined grooves on an outboard shoulder main groove side; and an angle of the first inclined groove (16) and an angle of the second inclined groove (17) with respect to the tire circumferential direction are gradually increases from the crown main groove toward the outboard tread edge.

8 Claims, 8 Drawing Sheets

FIG.9

TIRE

TECHNICAL FIELD

The present invention relates to a tire, more particularly to a tire having a tread portion axially divided into four land regions.

BACKGROUND ART

Japanese Patent Application Publication No. 2015-120380 (Patent Document 1) discloses a tire having a tread portion for which a mounting direction to a vehicle is specified. In this tread portion, there are formed an outboard shoulder land region, an outboard middle land region, an inboard middle land region, and an inboard shoulder land region. And in Patent Document 1, the arrangement of grooves disposed in the outboard middle land region is specifically defined with the view to improvement in on-snow performance, while suppressing a decrease in the rigidity of the outboard middle land region.

SUMMARY OF THE INVENTION

Problems to be Solved by the Invention

In the tire of Patent Document 1, however, the outboard middle land region has a tendency that the lateral rigidity thereof becomes insufficient. This leads to deterioration in the steering stability on dry road surfaces. Therefore, the tire is required to be improved in the steering stability on dry road surfaces.

The present invention was made in view of the above-described problems, and it is an objective of the present invention to proved a tire of which tread portion is axially divided into four land regions and which can exhibit excellent on-snow performance and steering stability on dry road surfaces.

According to one aspect of the present invention, a tire whose mounting direction to a vehicle is specified, comprises:

a tread portion having an outboard tread edge and an inboard tread edge to be located outboard and inboard of the vehicle, respectively, when the tire is mounted on the vehicle, the tread portion provided, between the inboard tread edge and the outboard tread edge, with three main grooves, the three main grooves extending continuously and circumferentially of the tire so that the tread portion is axially divided into four land regions, the three main grooves including
an outboard shoulder main groove disposed closest to the outboard tread edge among the three main grooves, and a crown main groove disposed adjacently to the outboard shoulder main groove on the inboard tread edge side of the outboard shoulder main groove, and the four land regions including
an outboard middle land region defined between the outboard shoulder main groove and the crown main groove, wherein the axial width of the outboard middle land region is the largest among the four land regions, the outboard middle land region is provided with first inclined grooves each inclined to a first direction with respect to the tire axial direction,
second inclined grooves each inclined to the first direction with respect to the tire axial direction, and fourth inclined groove inclined to a second direction with respect to the tire axial direction, the second direction being opposite to the first direction, the first inclined grooves extend across the entire axial width of the outboard middle land region, the second inclined grooves extend from the crown main groove and are terminated within the outboard middle land region, an angle of each of the first inclined grooves with respect to the tire circumferential direction gradually increases from the crown main groove toward the outboard tread edge, an angle of each of the second inclined grooves with respect to the tire circumferential direction gradually increases from the crown main groove toward the outboard tread edge, and each of the fourth inclined grooves intersects one of the second inclined grooves, and intersects one of the adjacent first inclined grooves at a position on the outboard shoulder main groove side of the midpoint of the length of the first inclined groove.

In this application, when a groove is expressed as being connected to another groove, it is intended to mean either the two grooves intersecting with each other to form a cross junction, or the two grooves one of which meets the other without intersecting to form a T or Y junction.

According to another aspect of the present invention, a tire whose mounting direction to a vehicle is specified, comprises:

a tread portion having an outboard tread edge and an inboard tread edge to be located outboard and inboard of the vehicle, respectively, when the tire is mounted on the vehicle, the tread portion provided, between the inboard tread edge and the outboard tread edge, with three main grooves, the three main grooves extending continuously and circumferentially of the tire so that the tread portion is axially divided into four land regions, the three main grooves including
an outboard shoulder main groove disposed closest to the outboard tread edge among the three main grooves, and a crown main groove disposed adjacently to the outboard shoulder main groove on the inboard tread edge side of the outboard shoulder main groove, and the four land regions including an outboard middle land region defined between the outboard shoulder main groove and the crown main groove, wherein the axial width of the outboard middle land region is the largest among the four land regions, the outboard middle land region is provided with first inclined grooves each inclined to a first direction with respect to the tire axial direction,
second inclined grooves each inclined to the first direction with respect to the tire axial direction, and
third inclined groove inclined to a second direction with respect to the tire axial direction, the second direction being opposite to the first direction, the first inclined grooves extend across the entire axial width of the outboard middle land region, the second inclined grooves extend from the crown main groove and are terminated within the outboard middle land region, an angle of each of the first inclined grooves with respect to the tire circumferential direction gradually increases from the crown main groove toward the outboard tread edge, an angle of each of the second inclined grooves with respect to the tire circumferential direction gradually increases from the crown main groove toward the outboard tread edge, and at least one of the third inclined grooves intersects with one of the first inclined grooves and then intersects one of the second inclined grooves.

According to still another aspect of the present invention, a tire whose mounting direction to a vehicle is specified, comprises:

a tread portion having an outboard tread edge and an inboard tread edge to be located outboard and inboard of the vehicle, respectively, when the tire is mounted on the vehicle, the tread portion provided, between the inboard tread edge and the outboard tread edge, with three main grooves, the three main grooves extending continuously and circumferentially of the tire so that the tread portion is axially divided into four land regions, the three main grooves including
an outboard shoulder main groove disposed closest to the outboard tread edge among the three main grooves, and
a crown main groove disposed adjacently to the outboard shoulder main groove on the inboard tread edge side of the outboard shoulder main groove, and the four land regions including an outboard middle land region defined between the outboard shoulder main groove and the crown main groove,
wherein the axial width of the outboard middle land region is the largest among the four land regions, the outboard middle land region is provided with first inclined grooves each inclined to a first direction with respect to the tire axial direction, second inclined grooves each inclined to the first direction with respect to the tire axial direction, and fifth inclined groove inclined to a second direction with respect to the tire axial direction, the second direction being opposite to the first direction, the first inclined grooves extend across the entire axial width of the outboard middle land region, the second inclined grooves extend from the crown main groove and are terminated within the outboard middle land region, an angle of each of the first inclined grooves with respect to the tire circumferential direction gradually increases from the crown main groove toward the outboard tread edge, an angle of each of the second inclined grooves with respect to the tire circumferential direction gradually increases from the crown main groove toward the outboard tread edge, and each of the fifth inclined grooves extends to one of the first inclined grooves to terminate without extending thereacross, and extends to one of the second inclined grooves to terminate without extending thereacross.

It is preferable that the fourth inclined grooves respectively extend across the second inclined grooves.

It is preferable that ends on the crown main groove side of the fourth inclined grooves are terminated within the outboard middle land region.

It is preferable that the fourth inclined grooves are respectively connected to the first inclined grooves on the outboard shoulder main groove side than ends on the outboard shoulder main groove side of the second inclined grooves.

It is preferable that the first inclined grooves each have a groove width decreasing from the outboard shoulder main groove toward the crown main groove.

It is preferable that the second inclined grooves each have a groove width decreasing from the crown main groove toward the outboard shoulder main groove.

It is preferable that each of the first inclined grooves and the second inclined grooves is curved, and the radius of curvature of the widthwise center line of the second inclined groove is smaller than the radius of curvature of the widthwise center line of the first inclined groove.

It is preferable that the outboard middle land region is provided with third inclined grooves inclined to the abovesaid second direction with respect to the tire axial direction.

It is preferable that each of the third inclined grooves extends from the outboard shoulder main groove to one of the second inclined grooves across one of the first inclined grooves.

It is preferable that each of the first inclined grooves and the third inclined grooves is curved, and the radius of curvature of the widthwise center line of the third inclined groove is larger than the radius of curvature of the widthwise center line of the first inclined groove.

It is preferable that the angle between the widthwise center line of the outboard shoulder main groove and the widthwise center line of each of the third inclined grooves is larger than the angle between the widthwise center line of the crown main groove and the widthwise center line of each of the first inclined grooves.

It is preferable that the crown main groove is disposed between the tire equator and the inboard tread edge.

It is preferable that the outboard middle land region is provided with fifth inclined grooves inclined to the abovesaid second direction with respect to the tire axial direction, and each of the fifth inclined grooves extends to one of the first inclined grooves to terminate without extending thereacross, and extends to one of the second inclined grooves to terminate without extending thereacross.

It is preferable that the outboard middle land region is provided with:

third inclined grooves inclined to the second direction with respect to the tire axial direction, wherein each of the third inclined grooves extends from the outboard shoulder main groove and intersects one of the first inclined grooves and then intersects one of the second inclined grooves; and fifth inclined grooves inclined to the second direction with respect to the tire axial direction, wherein each of the fifth inclined grooves extends to one of the first inclined grooves to terminate without extending thereacross, and extends to one of the second inclined grooves to terminate without extending thereacross.

It is preferable that the outboard middle land region is provided with:

third inclined grooves inclined to the second direction with respect to the tire axial direction, wherein each of the third inclined grooves extends from the outboard shoulder main groove and intersects one of the first inclined grooves and then intersects one of the second inclined grooves;

fifth inclined grooves inclined to the second direction with respect to the tire axial direction, wherein each of the fifth inclined grooves extends to one of the first inclined grooves to terminate without extending thereacross, and extends to one of the second inclined grooves to terminate without extending thereacross, and the crown main groove is disposed between the tire equator and the inboard tread edge.

It is preferable that the fifth inclined grooves are respectively connected to the first inclined grooves on the crown main groove side of the axial center line of the outboard middle land region.

It is preferable that the fifth inclined grooves are respectively connected to the second inclined grooves on the outboard shoulder main groove side of the axial center line of the outboard middle land region.

It is preferable that the first inclined grooves, the second inclined grooves, and the fifth inclined grooves are each curved, and
the radius of curvature of the widthwise center line of each of the fifth inclined grooves is larger than the radius of curvature of the widthwise center line of each of the first inclined grooves, and larger than the radius of curvature of the widthwise center line of each of the second inclined grooves.

DESCRIPTION OF THE PREFERRED EMBODIMENTS

The present invention can be applied to various tiers such as pneumatic tires as well as non-pneumatic tires so called airless tire, for various vehicles. e.g. a passenger car and a heavy-duty vehicle such as truck and bus and the like.

Hereinafter, taking a pneumatic tire for a passenger car as an example, embodiments of the present invention will be described in detail conjunction with accompanying drawings.

Figure 1:
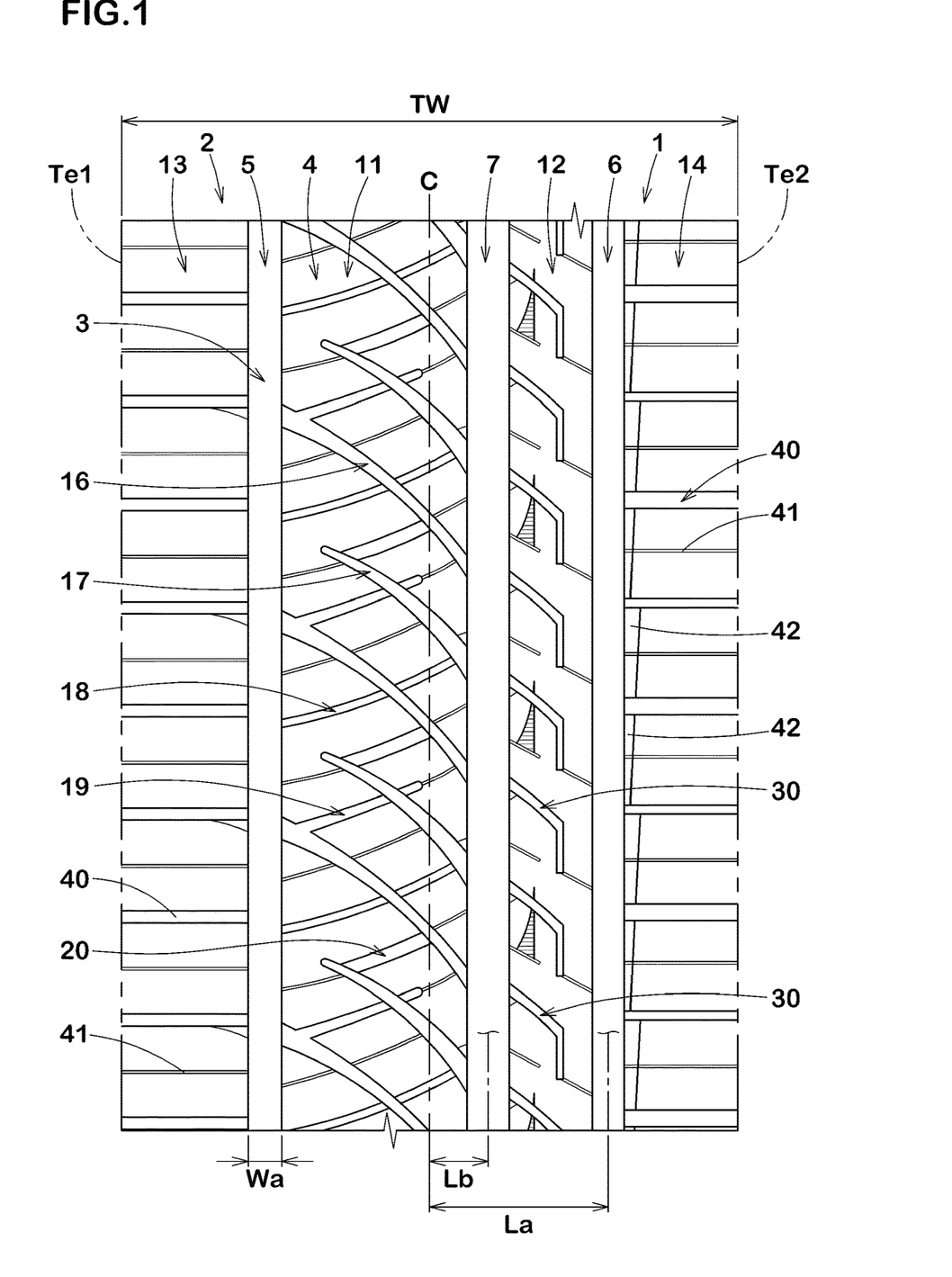
FIG. 1 is a developed partial view of the tread portion of a tire as an embodiment of the present invention.

FIG. 1 shows a tread portion 2 of a pneumatic tire 1 as an embodiment of the present invention.

As well known in the art, a pneumatic tire comprises a tread portion 2 whose radially outer surface defines the tread surface, a pair of axially spaced bead portions mounted on rim seats, a pair of sidewall portions extending between the tread edges and the bead portions, a carcass extending between the bead portions through the tread portion and the sidewall portions, and a tread reinforcement disposed radially outside the carcass in the tread portion.

The tread edges are the axial outermost edges of the ground contacting patch of the tire which occurs under a normally loaded condition when the camber angle of the tire is zero.

The tread width TW is the width measured under a unloaded condition, as the axial distance between the tread edges determined as above.

The unloaded condition of a pneumatic tire is such that the tire is mounted on a standard wheel rim and inflate to a standard pressure but loaded with no tire load.

The normally loaded condition of a pneumatic tire is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of a pneumatic tire refer to those under the unloaded condition of the tire unless otherwise noted.

According to the present invention, the tread portion 2 of the tire is provided with a tread pattern of left-right asymmetry (asymmetry about the tire equator C). An example is shown in FIG. 1.

Thus, the mounting position of the tire with respect to a vehicle is specified. For example, the sidewall portion (not shown) of the tire to be located on outside when installed on the vehicle is provided with an indication representing "outside", and the sidewall portion (not shown) to be located on inside is provided with an indication representing "inside".

The above-said tread edges of the tread portion 2 are an outboard tread edge Te1 to be positioned away from the center of the vehicle body and an inboard tread edge Te2 to be positioned close to the center of the vehicle body.

According thereto, in this application, the terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tread edge in order to refer relative positions in the tire axial direction.

In order to form the tread pattern, the tread portion 2 is provided, between the outboard tread edge Te1 and the inboard tread edge Te2, with three main grooves 3 extending continuously and circumferentially of the tire. Thereby, the tread portion 2 is axially divided into four annular land regions 4.

The main grooves 3 are:
an outboard shoulder main groove 5 disposed between the outboard tread edge Te1 and the tire equator C and being closest to the outboard tread edge Te1 among the three main grooves 3;

an inboard shoulder main groove 6 disposed between the inboard tread edge Te2 and the tire equator C and being closest to the inboard tread edge Te2 among the three main grooves 3; and a crown main groove 7 disposed between the outboard shoulder main groove 5 and the inboard shoulder main groove 6.

It is preferable that the distance La in the tire axial direction from the tire equator C to the widthwise center line of the outboard shoulder main groove 5 is set in a range from 0.20 to 0.35 times the tread width TW.

It is preferable that the distance La in the tire axial direction from the tire equator C to the widthwise center line of the inboard shoulder main groove 6 is set in a range from 0.20 to 0.35 times the tread width TW.

It is preferable that the distance Lb in the tire axial direction from the tire equator C to the widthwise center line of the crown main groove 7 is set in a range of not more than 0.15 times the tread width TW.

In the present embodiment, the crown main groove 7 is disposed on the inboard tread edge Te2 side of the tire equator C. However, it may be possible to dispose the crown main groove 7 at a different location.

In the present embodiment, each of the three main grooves 3 is a straight groove parallel with the tire circumferential direction. However, it may be possible that the main groove 3 extends in a zigzag or wavy manner.

The groove width wa of each of the main grooves 3 is not less than 3.0 mm, preferably set in a range from 4.0% to 7.0% of the tread width TW, for example.

In the present invention, a narrow groove whose groove width is less than 3.0 mm is not considered as a main groove. Incidentally, the groove width of a groove is a distance measured between the groove edges in a direction orthogonal to the widthwise center line.

It is preferable that the depth of each of the main grooves 3 is set in a range from 5 to 10 mm, for example, in the case of a pneumatic tire for a passenger car.

The four land regions 4 are an outboard middle land region 11, an inboard middle land region 12, an outboard shoulder land region 13, and a inboard shoulder land region 14. The outboard middle land region 11 is defined between the outboard shoulder main groove 5 and the crown main groove 7. The inboard middle land region 12 is defined between the inboard shoulder main groove 6 and the crown main groove 7.

The outboard shoulder land region 13 is divided between the outboard shoulder main groove 5 and the outboard tread edge Te1. The inboard shoulder land region 14 is defined between the inboard shoulder main groove 6 and the inboard tread edge Te2.

Figure 2:
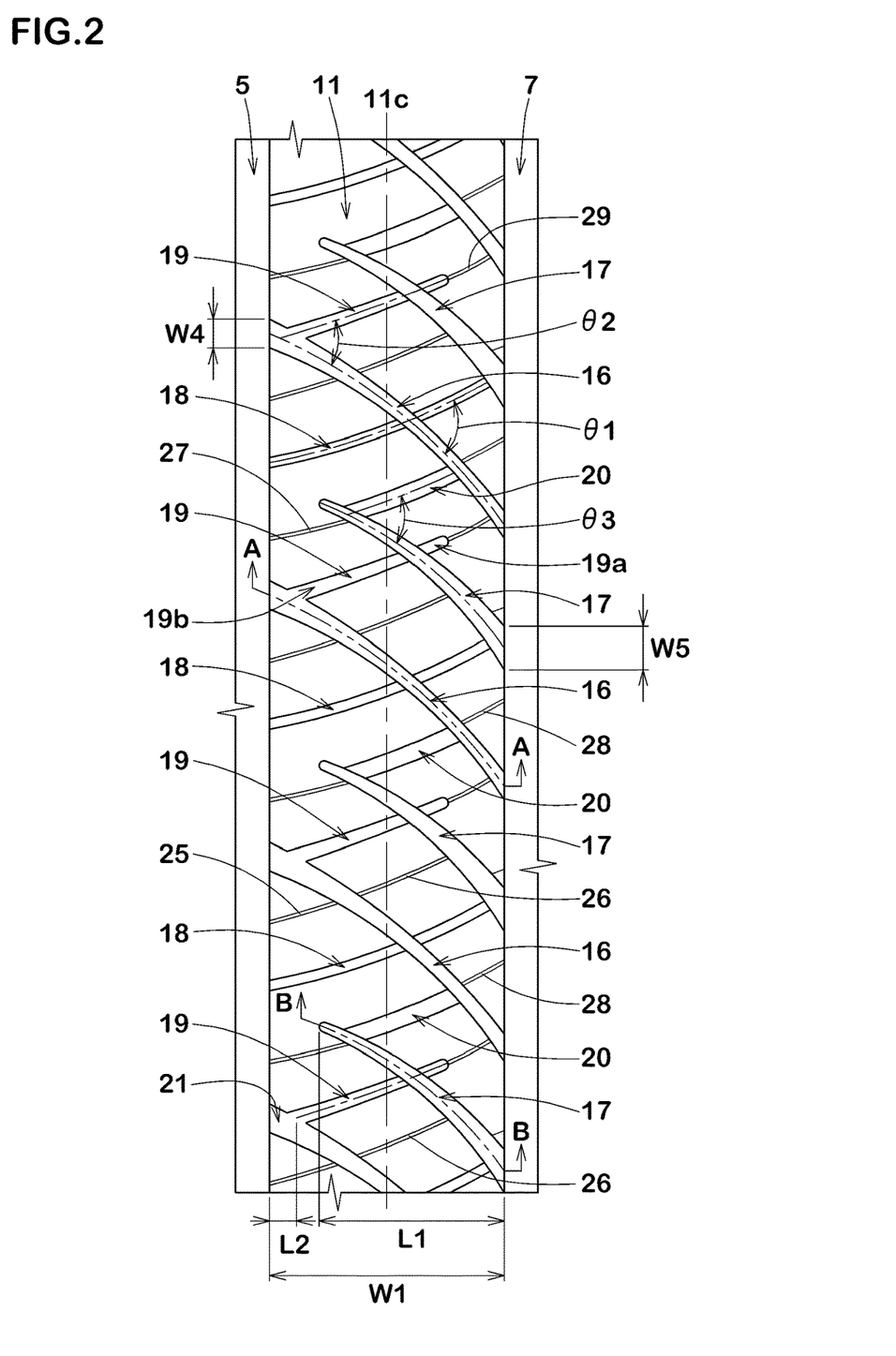
FIG. 2 is a top view of a part of the outboard middle land region shown in FIG. 1.

FIG. 2 shows a top view of a part of the outboard middle land region 11.

As shown in FIG. 1 and FIG. 2, the axial width w1 of the outboard middle land region 11 is largest among the four land regions 4.

In general, when the tread portion is made up of four land regions as in the present invention, the outboard middle land region is subjected to a large ground contacting pressure during straight running and cornering.
In the present invention, the outboard middle land region 11 has the largest axial width to have high rigidity, therefore, the outboard middle land region 11 in the present invention helps to improve the steering stability on dry road surfaces.

Preferably, the axial width w1 of the outboard middle land region 11 is set in a range from 0.25 to 0.35 times the tread width TW, for example.

The outboard middle land region 11 is provided with first inclined grooves 16 and second inclined grooves 17 each inclined to a first direction with respect to the tire axial direction (downward to the right in FIG. 2).

Further, the outboard middle land region 11 is provided with third inclined grooves 18 inclined to a second direction with respect to the tire axial direction (upward to the right in FIG. 2). which is opposite to the first direction, Further. the outboard middle land region 11 is provided with fourth inclined grooves 19 inclined to the second direction with respect to the tire axial direction.

Since a large ground contacting pressure acts on the outboard middle land region 11, each inclined groove provided on the land region 11 can provide a large compacted snow block (snow column) and thereby can generate a larger shearing force when running on snow.

The first inclined grooves 16 extend across the entire axial width of the outboard middle land region 11. Therefore, the first inclined groove 16 can produce an axially long snow block when running on snow, and thereby traction performance on snow can be improved.

The second inclined grooves 17 extend from the crown main groove 7 toward the outboard shoulder main groove 5, but terminate within the outboard middle land region 11, without reaching the outboard shoulder main groove 5.
such second inclined grooves 17 can improve the performance on snow, while maintaining the rigidity of the outboard middle land region 11 and maintaining the steering stability on dry road surfaces.

The angle of the widthwise center line of each of the first inclined grooves 16 with respect to the tire circumferential direction, and
the angle of the widthwise center line of each of the second inclined grooves 17 with respect to the tire circumferential direction
are gradually increased from the crown main groove 7 to the outboard tread edge Te1. As a result, the lateral rigidity of the outboard middle land region 11 is increased toward the outboard shoulder main groove 5, and the steering stability on dry road surfaces is improved.

Each of the fourth inclined grooves 19 is connected to one of the second inclined grooves 17.
Further, each of the fourth inclined grooves 19 is connected to one of the first inclined grooves 16 at a position on the outboard shoulder main groove 5 side of the midpoint of the length of the first inclined groove 16. During cornering, such fourth inclined grooves 19 form hard compacted snow blocks, particularly at the portions communicating with the first inclined grooves 16. This helps to improve the cornering performance on snowy road surfaces.

The first inclined grooves 16 are each curved so that the widthwise center line curves to protrude toward one side in the tire circumferential direction (upward in FIG. 2) from a straight line drawn between both ends of the widthwise center line.

The radius of curvature of the widthwise center line of the first inclined groove 16 is, for example, set in a range from 50 to 200 mm, and more preferably, 90 to 110 mm.

If the widthwise center line of the inclined groove is not an accurate circular arc, the radius of curvature means that of an imaginary circular arc passing through three points at both ends of the widthwise center line and a midpoint of the length of the widthwise center line.

The angle of the widthwise center line of the inclined groove 16 with respect to the tire circumferential direction is preferably, set in a range from 45 to 55 degrees, for example. Such first inclined grooves 16 can generate a snow block shearing force in multiple directions.

The first inclined grooves 16 each have a groove width decreasing from the outboard shoulder main groove 5 toward the crown main groove 7, and the groove width at its end on the outboard shoulder main groove 5 side is larger than the groove width at its end on the crown main groove 7 side.

The groove width at the end on the outboard shoulder main groove 5 side is set in a range from 6.0 to 8.0 mm, for example. The groove width at the end on the crown main groove 7 side is set in a range from 5.0 to 7.0 mm, for example.

Figure 3:
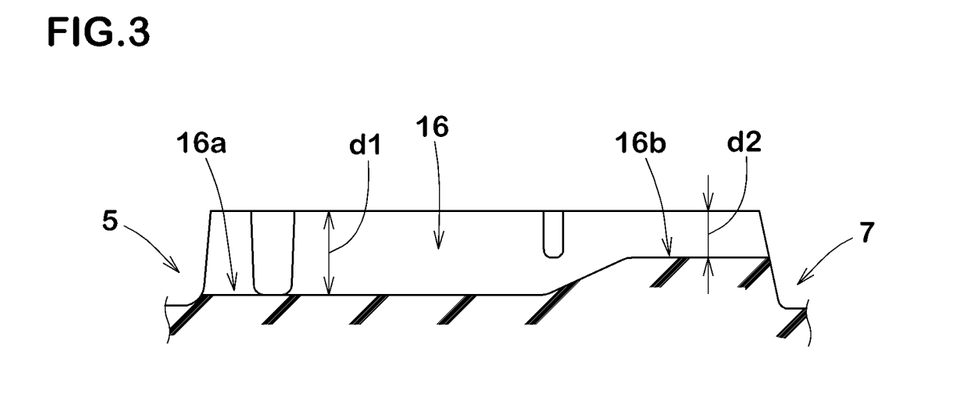
FIG. 3 is a cross sectional view taken along line A-A of FIG. 2.

FIG. 3 is a cross-sectional view of the first inclined groove 16 taken along line A-A of FIG. 2 (widthwise center line). As shown in FIG. 3, the first inclined groove 16 comprises an outer part 16a connected to the outboard shoulder main groove 5, and an inner part 16b connected to the crown main groove 7. The inner part 16b has a smaller depth than the outer part 16a. For example, the depth d2 of the inner part 16b is set in a range from 0.40 to 0.70 times the depth d1 of the outer part 16a. The inner part 16b is formed on the crown main groove 7 side than the center in the tire axial direction of the outboard middle land region 11.

Such inner parts 16b help to improve the steering stability on dry road surfaces.

It is preferable that, as shown in FIG. 2, the second inclined grooves 17 extend across the axial or widthwise center line 11c of the outboard middle land region 11.

Preferably, the axial length L1 of the second inclined groove 17 is set in a range from 0.70 to 0.85 times the axial width w1 of the outboard middle land region 11, for example.

Such second inclined grooves 17 help to improve the on-snow performance and the steering stability on dry road surfaces in a well-balanced manner.

The second inclined grooves 17 are curved in the same direction as the first inclined grooves 16.

Preferably, the radius of curvature of the widthwise center line of each of the second inclined grooves 17 is smaller than the radius of curvature of the widthwise center line of each of the first inclined grooves 16.

The difference in radius of curvature between the second inclined grooves 17 and the first inclined grooves 16 is in a range from 10 to 50 mm, for example.

The radius of curvature of the second inclined grooves 17 is set in a range from 50 to 200 mm, and more preferably, 80 to 110 mm.

Preferably, the angle of the widthwise center line of each of the second inclined grooves 17 with respect to the tire circumferential direction is set in a range from 45 to 55 degrees, for example.

It is it is preferable that the second inclined grooves 17 each have a groove width decreasing from the crown main groove 7 toward the outboard shoulder main groove 5, and the groove width at its end on the crown main groove 7 side is larger than the groove width at its terminal end positioned within the outboard middle land region 11.

The groove width at the end on the crown main groove 7 side is set in a range from 10.0 to 12.0 mm, for example.

The groove width at the terminal end is set in a range from 1.0 to 3.0 mm, for example. Here, the groove width at the terminal end is measured at a position excluding the arc-shaped edge at the terminal end.

The second inclined grooves 17 together with the first inclined grooves 16 provide a large snow block shearing force, while maintaining the rigidity of the outboard middle land region 11.

More preferably, the groove width of each of the second inclined grooves 17 in the present embodiment is gradually decreased from the crown main groove 7 to its terminal end positioned within the outboard middle land region 11.

Such second inclined grooves 17 can further suppress the decrease in the rigidity of the outboard middle land region 11.

Preferably, the opening width w5 of the second inclined groove 17 to the crown main groove 7 is larger than the opening width W4 of the first inclined groove 16 to the outboard shoulder main groove 5. For example, the opening width W5 is in a range from 1.2 to 1.5 times the opening width W4.

This makes it easier for water existing in the second inclined grooves 17 to be discharged toward the outboard shoulder main groove 5 through the first inclined grooves 16 during running in wet conditions.

Figure 4:
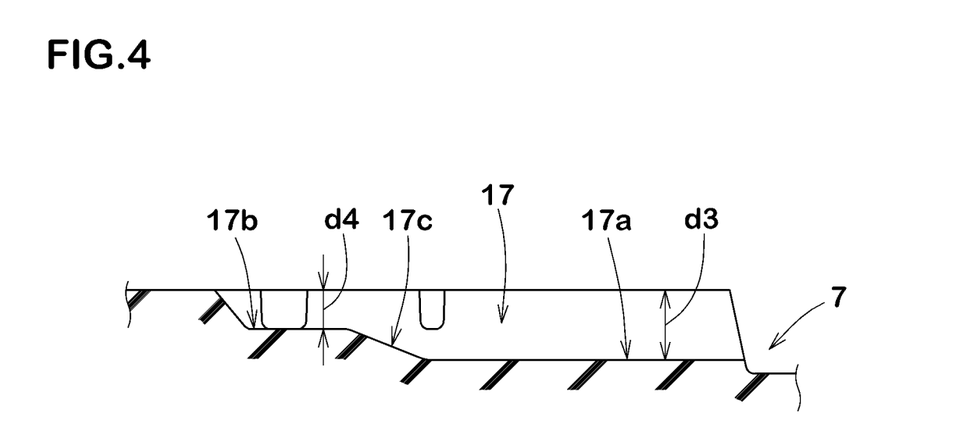
FIG. 4 is a cross sectional view taken along line B-B of FIG. 2.

FIG. 4 is a cross sectional view of the second inclined groove 17 taken along line B-B of FIG. 2 (widthwise center line).

Preferably, the depth of each of the second inclined grooves 17 is gradually decreased from the crown main groove 7 toward the outboard shoulder main groove 5 as shown in FIG. 4. Such second inclined grooves 17 together with the first inclined grooves 16 improve the performance on snow and the steering stability on dry road surfaces in a well-balanced manner.

The second inclined groove 17 comprises a first constant depth portion 17a, a second constant depth portion 17b, and a variable depth portion 17c therebetween.

The first constant depth portion 17a has a constant depth along its length and is connected to the crown main groove 7.

Preferably, the first constant depth portion 17a has the same depth as the outer part 16a of the first inclined groove 16 shown in FIG. 3.

The second constant depth portion 17b is disposed on the outboard shoulder main groove 5 side of the first constant depth portion 17a.

The second constant depth portion 17b has a constant depth d4 along its length, and the constant depth d4 is a smaller depth than that of the first constant depth portion 17a.

Preferably, the second constant depth portion 17b has the same depth as the inner part 16b of the first inclined groove 16. The depth d4 of the second constant depth portion 17b is, for example, set in a range from 0.40 to 0.70 times the depth d3 of the first constant depth portion 17a.

The variable depth portion 17c has a bottom surface inclined with respect to the tire axial direction, and the depth gradually decreases from the first constant depth portion 17a to the second constant depth portion 17b.

At least one of the third inclined grooves 18 is connected to one of the first inclined grooves 16 and one of the second inclined grooves 17.

Preferably, each of the third inclined grooves 18 extends from the outboard shoulder main groove 5 and intersects one of the first inclined grooves 16 and then meets intersects one of the second inclined grooves 17 without intersecting as shown in FIG. 2.

The third inclined grooves 18 respectively intersect the first inclined grooves 16 and meet the second inclined grooves 17 on the crown main groove 7 side of the axial or widthwise center line 11c of the outboard middle land region 11.

The third inclined groove 18 intersects a variable depth portion (shown in FIG. 3) of the first inclined groove 16. Further, the third inclined groove 18 is connected to the first constant depth portion 17a (shown in FIG. 4) of the second inclined groove 17.

When running on snow, such third inclined grooves 18 can strongly compact the snow in the intersecting portions with the first inclined grooves 16 and the second inclined grooves 17 and can further improve the performance on snow.

The third inclined grooves 18 extend from the outboard shoulder main groove 5 toward the crown main groove 7, and preferably extend across the axial center line 11c. The third inclined grooves 18 respectively cross the first inclined grooves 16 on the crown main groove 7 side of the axial center line 11c.

Preferably, the angle θ1 between the widthwise center line of the first inclined groove 16 and the widthwise center line of the third inclined groove 18 is set in a range from 40 to 55 degrees, for example.

Each of the third inclined grooves 18 is connected to one of the second inclined grooves 17 near the end on the crown main groove side 7 of the second inclined groove 17, and terminates without crossing the second inclined groove 17.

The third inclined groove 18 is curved so that the groove widthwise center line protrudes from a straight line drawn between both ends of the widthwise center line toward the other side in the tire circumferential direction than that of the first inclined grooves 16 (downward in FIG. 2).

Preferably, the radius of curvature of the widthwise center line of the third inclined groove 18 is larger than the radius of curvature of the widthwise center line of the first inclined groove 16.

The difference in radius of curvature between the third inclined grooves 18 and the first inclined grooves 16 is, for example, 50 to 200 mm.

Preferably, the radius of curvature of the widthwise center line of the third inclined groove 18 is 150 to 450 mm, for example.

It is preferable that the angle of the widthwise center line of the third inclined groove 18 with respect to the tire circumferential direction gradually decreases toward the crown main groove 7. Preferably, the angle is set in a range from 60 to 80 degrees, for example.

It is preferable that the angle between the widthwise center lines of the outboard shoulder main groove 5 and the third inclined groove 18 is larger than the angle between the widthwise center lined of the crown main groove 7 and the first inclined groove 16.

Thereby, the rigidity of the outboard middle land region 11 near the outboard shoulder main groove 5 becomes relatively high, and thus the behavior of the vehicle when a large steering angle is given to the tires on dry road surfaces is stabilized.

It is preferable that the groove width of the third inclined groove 18 is constant along its length. The groove width is set in a range from 2.0 to 3.0 mm, for example.

It is preferable that the depth of the third inclined groove 18 is constant along its length.

In the present embodiment, the depth of the third inclined grooves 18 is smaller than the depth of the outer part 16a of the first inclined grooves 16 and the depth of the first constant depth portion 17a of the second inclined grooves 17.

Preferably, the depth of the third inclined grooves 18 is the same as the depth of the inner part 16b of the first inclined groove 16 and the depth of the second constant depth portion 17b of the second inclined groove 17.

Further, the bottom surface of the third inclined groove 18 may be provided with a sipe (not shown) extending along the length of the third inclined groove 18.

Here, the term "sipe" means a narrow groove having a width not more than 1.5 mm inclusive of a cut having no substantial width.

The third inclined grooves 18 provided with the sipes can improve the steering stability on dry road surfaces while maintaining the performance on snow.

Preferably, the above-mentioned fourth inclined grooves 19 are respectively connected to the first inclined grooves 16 at an axial position on the outboard shoulder main groove 5 side than the ends on the outboard shoulder main groove 5 side of the second inclined grooves 17.

In the present embodiment, the fourth inclined groove 19 is connected to the outer part 16a (shown in FIG. 3) of the first inclined groove 16.

Given the axial distance L2 (shown in FIG. 2) from a position at which the widthwise center line of the fourth inclined groove 19 intersects the first inclined groove 16 (groove edge) to the outboard shoulder main groove 5 (groove edge), the axial distance L2 is preferably set in a range from 0.05 to 0.20 times the axial width w1 of the outboard middle land region 11.

As a result, the on-snow performance and the steering stability on dry road surfaces are improved in a well-balanced manner.

The fourth inclined grooves 19 extend across the axial center line 11c. And the fourth inclined grooves 19 respectively intersect with the second inclined grooves 17 on the crown main groove 7 side of the axial center line 11c. In the present embodiment, the fourth inclined groove 19 intersects the first constant depth portion 17a (shown in FIG. 4) of the second inclined groove 17.

The ends on the crown main groove side 7 of the fourth inclined grooves 19 terminate within the outboard middle land region 11. Therefore, the fourth inclined grooves 19 intersect the deeper portions of the first inclined grooves 16 and the second inclined grooves 17, and can form hard snow blocks (columns) at the intersections of the grooves.

The axial length of the fourth inclined groove 19 is smaller than the axial length of the third inclined groove 18.

Such fourth inclined grooves 19 can improve the performance on snow, while maintaining the rigidity of the outboard middle land region 11.

For example, the fourth inclined grooves 19 are preferably convexly curved in the same direction as the third inclined grooves 18. Preferably, the radius of curvature of the widthwise center line of the fourth inclined groove 19 is set in a range from 150 to 450 mm, for example. In the present embodiment, the radius of curvature of the fourth inclined grooves 19 is the same as that of the third inclined grooves 18. Such fourth inclined grooves 19 can further maintain the rigidity of the outboard middle land region 11.

It is preferable that the angle between the fourth inclined groove 19 and the outboard shoulder main groove 5 is larger than the angle between the first inclined groove 16 and the crown main groove 7, and larger than the angle between the second inclined groove 17 and the crown main groove 7. Preferably, the angle between the fourth inclined groove 19 and the outboard shoulder main groove 5 is set in a range from 60 to 80 degrees, for example.

Preferably, the angle θ2 between the first inclined groove 16 and the fourth inclined groove 19 is set in a range from 45 to 55 degrees, for example.

Here, each angle is between the grooves' widthwise center lines.

It is preferable that the groove width of the fourth inclined groove 19 is constant along its length.

It is preferable that the groove width of the fourth inclined grooves 19 is larger than the groove width of the third inclined grooves 18, and smaller than the maximum groove width of the first inclined grooves 16. It is preferable that the maximum depth of the fourth inclined grooves 19 is larger than the maximum depth of the third inclined grooves 18. Such fourth inclined grooves 19 can improve the on-snow performance and the steering stability on dry road surfaces in a well-balanced manner.

In the fourth inclined groove 19 in the present embodiment, its tip portion 19a on the crown main groove 7 side of the intersecting second inclined groove 17 is smaller in the groove depth than its main portion 19b on the outboard shoulder main groove 5 side of the second inclined groove 17.

Such fourth inclined grooves 19 help to improve the steering stability on dry road surfaces.

The outboard middle land region 11 in the present embodiment is provided with fifth inclined grooves 20.

The fifth inclined grooves 20 meet the respective first inclined grooves 16 without intersecting, so as to form T-junctions. Further, the fifth inclined grooves 20 meet the respective second inclined grooves 17 without intersecting, so as to form T-junctions.

However, the present invention is not limited to such T-junctions, and the fifth inclined grooves 20 may intersect the first inclined grooves 16 and/or the second inclined grooves 17 to form cross junctions.

The fifth inclined grooves 20 meet the first inclined grooves 16 on the crown main groove 7 side of the axial center line 11c. The fifth inclined grooves 20 meet the second inclined grooves 17 on the outboard shoulder main groove 5 side of the axial center line 11c. Thus, the fifth inclined grooves 20 extend across the axial center line 11c. specifically, the fifth inclined groove 20 meets the inner part 16b (shown in FIG. 3) of the first inclined groove 16, and meets the second constant depth portion 17b (shown in FIG. 4) of the second inclined groove 17.

By being connected to the portions of the first inclined grooves 16 and the second inclined grooves 17 where the groove depths are small, the fifth inclined grooves 20 can maintain the rigidity of the land region.

It is preferable that the axial length of each of the fifth inclined grooves 20 is smaller than that of the fourth inclined grooves 19.

The fifth inclined grooves 20 are inclined to the above-said second direction with respect to the tire axial direction. The fifth inclined grooves 20 extend parallel with the fourth inclined grooves 19.

The angle θ3 between the widthwise center lines of the second inclined groove 17 and the fifth inclined groove 20 is preferably set in a range from 45 to 55 degrees.

In the present embodiment, the fifth inclined grooves 20 are curved in the same direction as the third inclined grooves 18.

Preferably, the radius of curvature of the widthwise center line of the fifth inclined groove 20 is larger than the radius of curvature of the widthwise center line of the first inclined groove 16 and the radius of curvature of the widthwise center line of the second inclined groove 17.

Specifically, the radius of curvature of the fifth inclined groove 20 is set in a range from 180 to 440 mm.

It is preferable that the groove width of the fifth inclined grooves 20 is constant along its length.

It is preferable that the groove width of the fifth inclined grooves 20 is larger than the groove width of the fourth inclined grooves 19 and smaller than the maximum groove width of the first inclined grooves 16.

Further, it is preferable that the maximum depth of the fifth inclined grooves 20 is smaller than the maximum depth of the fourth inclined grooves 19.

The outboard middle land region 11 in the present embodiment is preferably provided with sipes 25 in order to improve on-snow performance and wet performance.

Preferably, the width of the sipes 25 is set in a range from 0.4 to 1.0 mm, for example.

Preferably, the sipes 25 are inclined to the second direction with respect to the tire axial direction.

Further, the sipes 25 are preferably convexly curved in the same direction as the third inclined grooves 18.

Such sipes 25 provide large frictional force by their edges while maintaining the rigidity of the outboard middle land region 11.

The sipes 25 in the present embodiment are:

plural pairs of a first sipe 26 and a second sipe 27 each extending from the outboard shoulder main groove 5 to one of the second inclined grooves 17, third sipes 28 extending from the crown main groove 7 to the respective first inclined grooves 16, and fourth sipes 29 respectively extending from the fourth inclined grooves 19 to the first inclined grooves 16 as shown in FIG. 2.

Each of the first sipes 26 extends from the outboard shoulder main groove 5, and intersects one of the first inclined grooves 16, and extends through between the adjacent third inclined groove 18 and fourth inclined groove 19, and then meets one of the second inclined grooves 17 without intersecting, on the crown main groove 7 side of the axial center line 11c. Preferably, the first sipes 26 extend parallel with the third inclined grooves 18.

Each of the second sipes 27 extends from the outboard shoulder main groove 5 through between the adjacent third inclined groove 18 and fourth inclined groove 19, and meets one of the second inclined grooves 17 without intersecting, on the outboard shoulder main groove 5 side of the axial center line 11c. As to the meeting position of the second sipe 27 with the second inclined groove 17, it is preferable that the second sipe 27 meets an extension of the fifth inclined groove 20 toward the outboard shoulder main groove 5.

Preferably, the second sipes 27 extend parallel with the fourth inclined grooves 19.

Each of the third sipes 28 is disposed between the adjacent first inclined groove 16 and second inclined groove 17, on the crown main groove 7 side of the axial center line 11c. Each of the third sipes 28 extends from the crown main groove 7 toward the outboard shoulder main groove 5 and meets one of the first inclined grooves 16 without intersecting.

As to the meeting position of the third sipe 28 with the first inclined groove 16, it is preferable that the third sipe 28 meets an extension of the fifth inclined groove 20 toward the crown main groove 7.

Preferably, the third sipes 28 extend parallel with the third inclined grooves 18.

Each of the fourth sipes 29 is disposed on the crown main groove 7 side of the axial center line 11c and extends from one of the first inclined grooves 16 to the end of one the fourth inclined grooves 19.

Preferably, the fourth sipes 29 extend parallel with the fifth inclined grooves 20.

Figure 5:
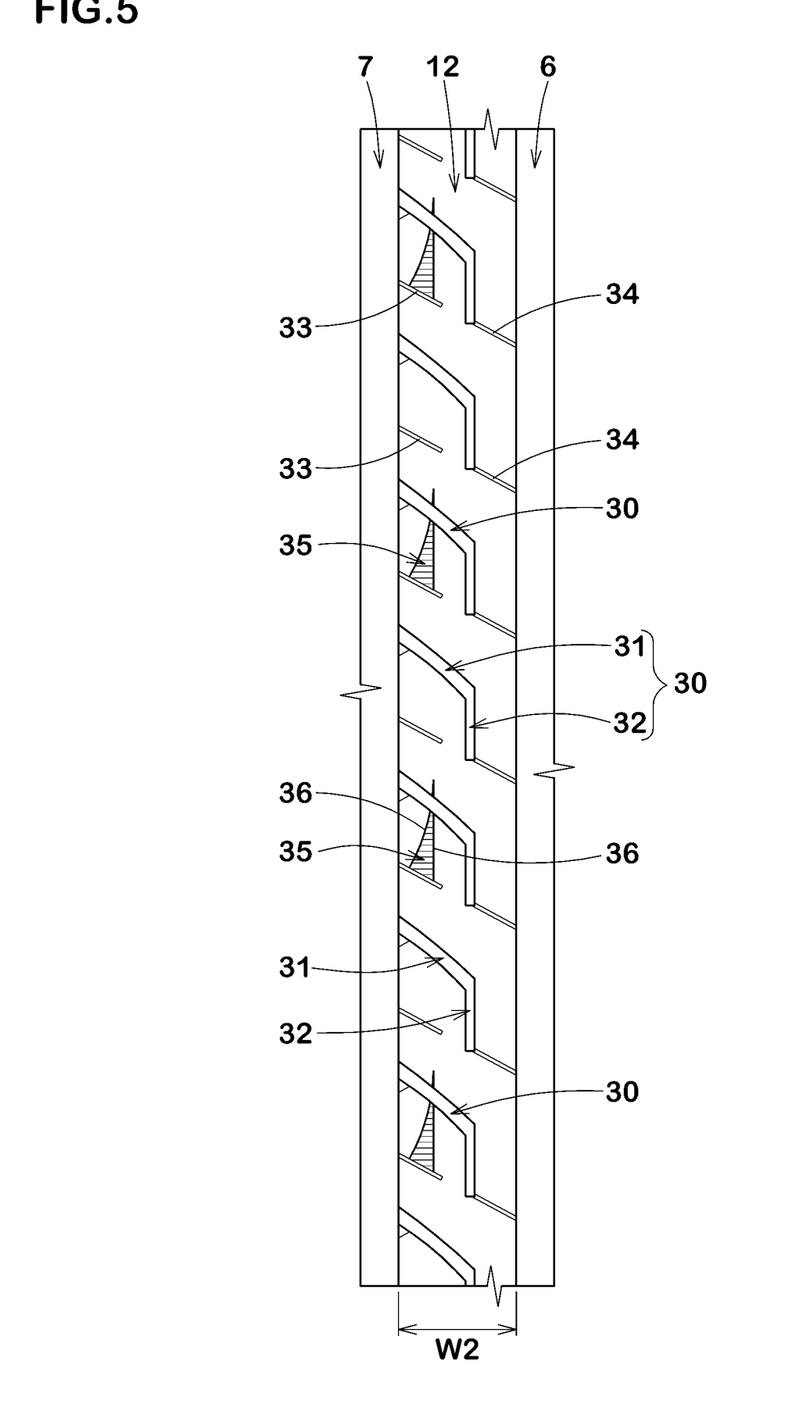
FIG. 5 is a top view of a part of the inboard middle land region shown in FIG. 1.

FIG. 5 shows a part of the inboard middle land region 12. The axial width w2 of the inboard middle land region 12 is preferably set in a range from 0.10 to 0.20 times the tread width TW, for example.

The inboard middle land region 12 in this example is provided with middle lateral grooves 30 extending from the crown main groove 7 and terminated within the inboard middle land region 12.

As shown in FIG. 5, the middle lateral groove 30 comprises a first portion 31 extending from the crown main groove 7 while inclining to the first direction with respect to the tire axial direction, and a second portion 32 extending continuously from the first portion 31 in the tire circumferential direction. Preferably, the depth of the second portion 32 is smaller than the depth of the first portion 31.

when running on snow, the middle lateral groove 30 can generate snow block (column) shearing force in the tire circumferential direction and tire axial direction, while maintaining steering stability on dry road surfaces.

The inboard middle land region 12 is further provided with first middle sipes 33 and second middle sipes 34.

The first middle sipes 33 extend from the crown main groove 7 and terminate within the inboard middle land region 12.

The second middle sipes 34 extend from the inboard shoulder main groove 6, and meet the respective middle lateral grooves 30.

The inboard middle land region 12 in the present embodiment is further provided with a sipe combination 35 made up of two sipes 36 and multiple cuts extending between the two sipes 36.

The two sipes 36 in this example extend from one of the first middle sipes 33 to the first portion 31 of one of the middle lateral grooves 30, while gradually decreasing the distance therebetween.

In this example, the sipe combination 35 is provided for every other first middle sipe 33 as shown in FIG. 5.

Such sipe combination 35 helps to improve grip performance at the start of use of the tire.

Figure 6:
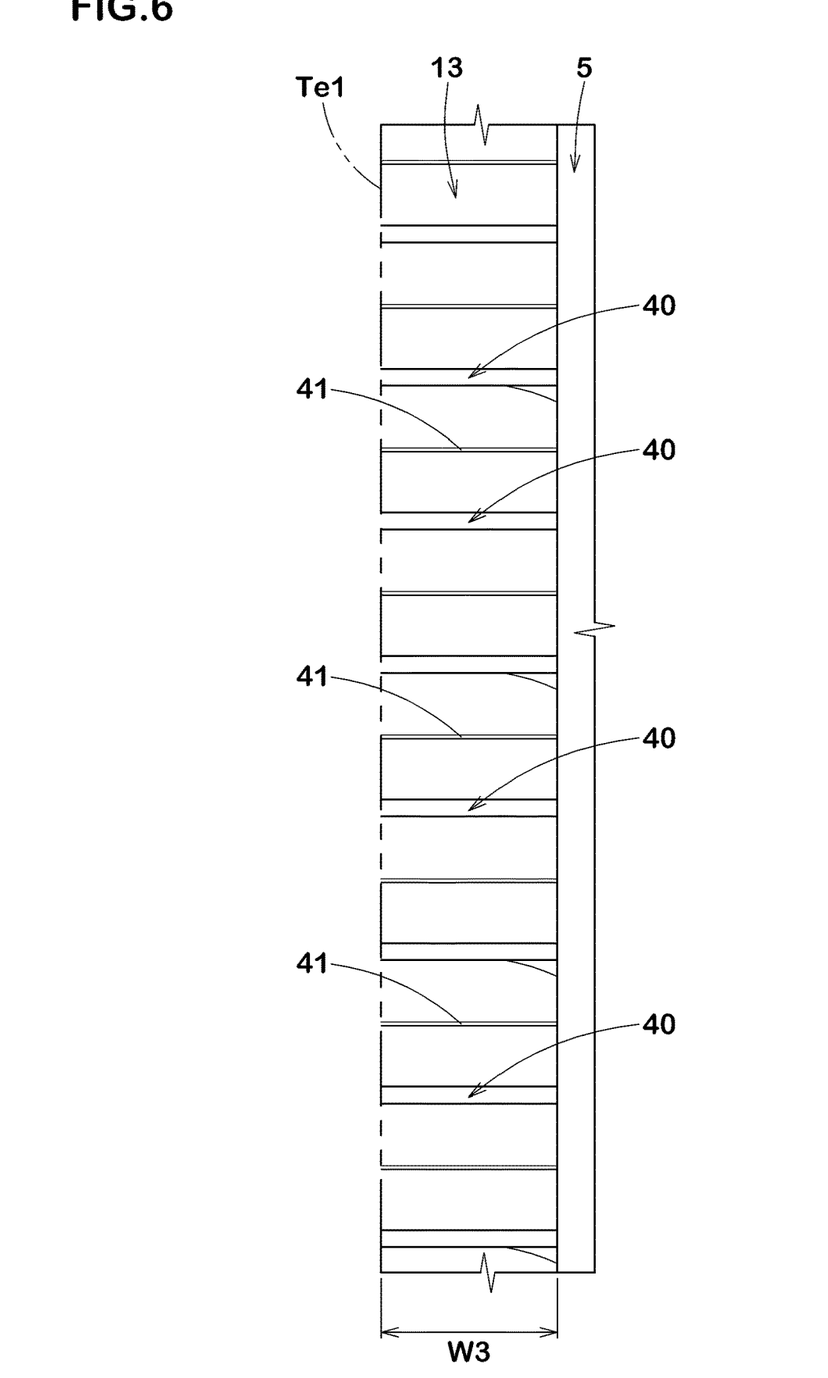
FIG. 6 is a top view of a part of the outboard shoulder land region shown in FIG. 1.

FIG. 6 shows a part of the outboard shoulder land region 13.

Preferably, the axial width w3 of the outboard shoulder land region 13 is larger than the axial width w2 of the inboard middle land region 12 as shown in FIG. 1.

Preferably, the axial width w3 is set in a range from 0.15 to 0.25 times the tread width TW, for example.

The outboard shoulder land region 13 is provided with shoulder lateral grooves 40 extending in the tire axial direction, and shoulder sipes 41 extending in the tire axial direction. such shoulder lateral grooves 40 and shoulder sipes 41 help to improve the performance on snow.

Similarly to the outboard shoulder land region 13, the inboard shoulder land region 14 is also provided with shoulder lateral grooves 40 extending in the tire axial direction, and shoulder sipes 41 extending in the tire axial direction as shown in FIG. 1.

Preferably, the inboard shoulder land region 14 is provided with a chamfer 42 extending between the ground contacting top surface of the inboard shoulder land region 14 (constituting a part of the tread surface) and the side surface on the inboard shoulder main groove 6 side of the inboard shoulder land region 14.

Preferably, the chamfer 42 is provided with narrow grooves (not shown) extending from the tread surface to the above-said side surface. Thereby, grip performance on snow can be further improved.

While detailed description has been made of a preferable embodiment of the present invention, the present invention can be embodied in various forms without being limited to the illustrated embodiment.

Comparison Test 1

Figure 7:
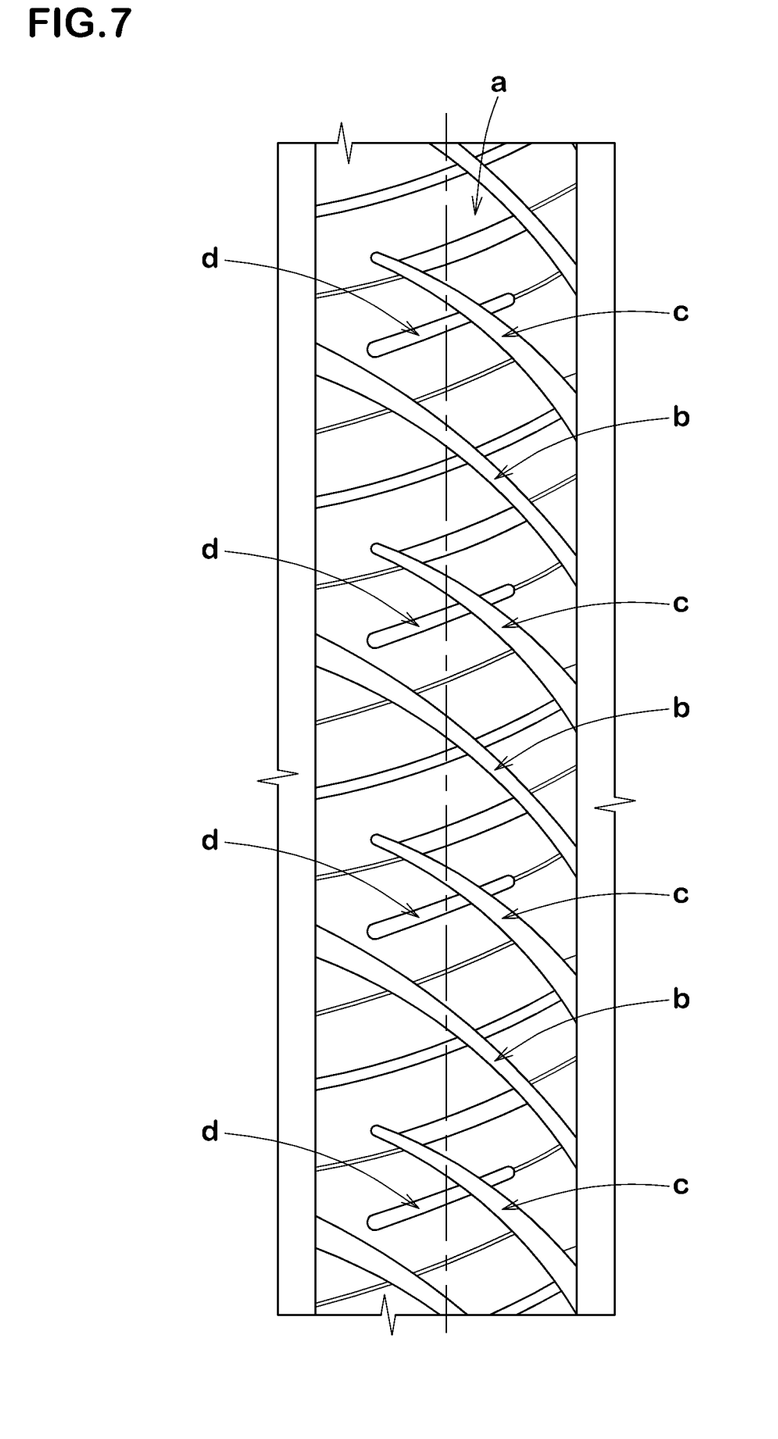
FIG. 7 is a top view of a part of the tread portion of a tire as a comparative example.

Pneumatic tires of size 215/60R16 were experimentally manufactured as test tires including:

embodiment tires (Ex.1-Ex.9) having tread patterns based on the tread pattern shown in FIG. 1; and a comparative example tire (Com) having a tread pattern substantially the same as that shown in FIG. 1 except that, as shown in FIG. 7, the outboard middle land region (a) was provided with a fourth inclined groove (d) intersecting with the second inclined groove (c) and not intersecting with the first inclined groove (b).

Each test tire was tested for on-snow performance and steering stability on dry road surfaces as follows, using a 2500 cc front wheel drive passenger car as a test car where the test tires were mounted on standard wheel rims of size 16×6.5 and inflated to 240 kPa.

<On-Snow Performance>

Snow Performance of Each Test Tire when the Test Car was Running on a snowy road was evaluated by the test driver. The results are shown in Table 1 by an index based on the comparative example being 100, wherein the larger the numerical value, the better the on-snow performance.

<Steering Stability on Dry Road Surfaces> steering stability when the test car was running on a dry road surface was evaluated by the test driver.

The results are shown in Table 1 by an index based on the comparative example being 100, wherein the larger the numerical value, the better the steering stability on dry road surfaces.

TABLE 1

| Tire | Com | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| outboard middle land region (FIG. No.) | 7 | 2 | 2 | 2 | 2 | 2 | 2 | 2 | 2 | 2 |
| W1/TW | 0.30 | 0.30 | 0.25 | 0.28 | 0.32 | 0.35 | 0.30 | 0.30 | 0.30 | 0.30 |
| L2/W1 | — | 0.12 | 0.12 | 0.12 | 0.12 | 0.12 | 0.05 | 0.10 | 0.15 | 0.20 |
| on-snow performance | 100 | 107 | 107 | 107 | 106 | 105 | 108 | 107 | 107 | 105 |
| steering stability | 100 | 102 | 101 | 102 | 103 | 103 | 100 | 101 | 102 | 102 |

From the test results, it was confirmed that the embodiment tires exhibited excellent on-snow performance and steering stability on dry road surfaces.

Comparative Test 2

Figure 8:
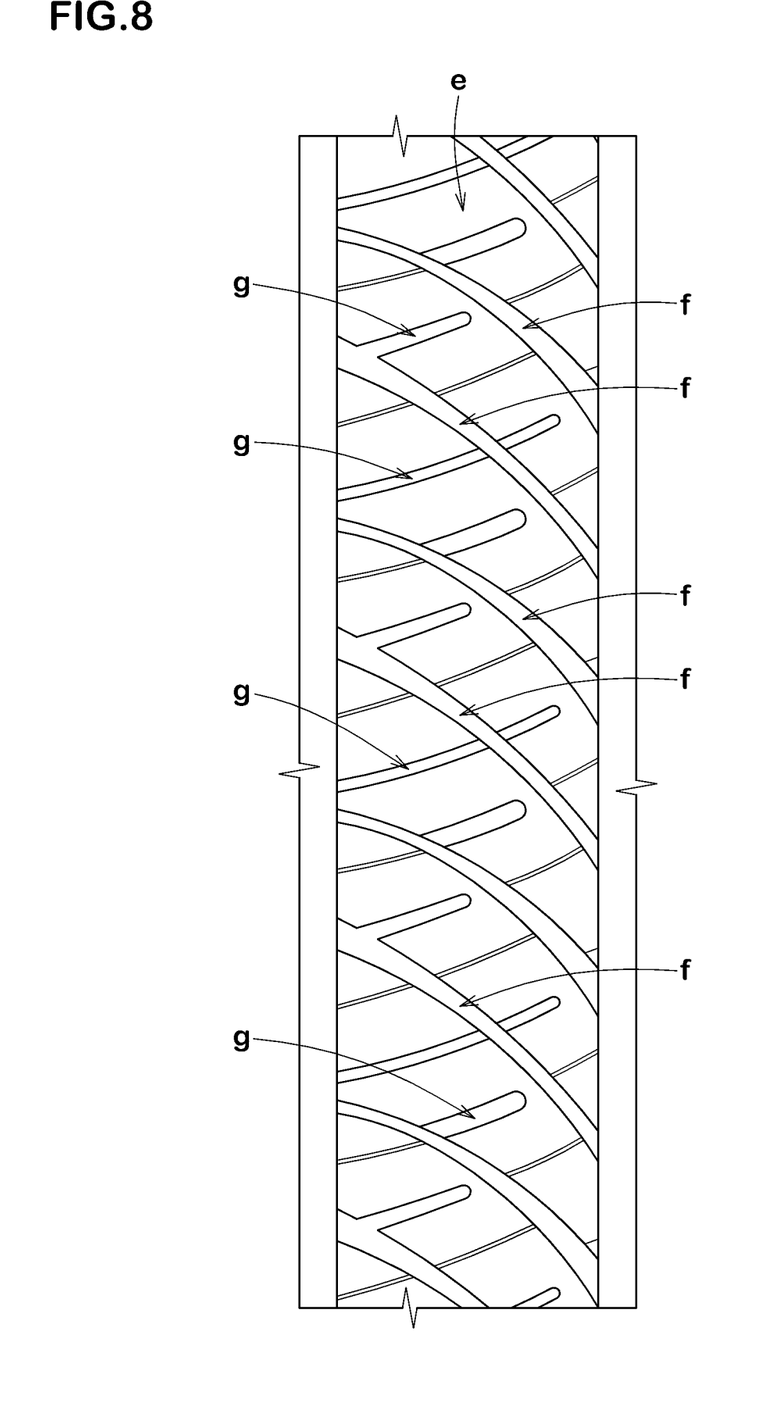
FIG. 8 is a top view of a part of the tread portion of a tire as a reference example 1.

Pneumatic tires of size 215/60R16 were experimentally manufactured as test tires including:

embodiment tires (Ex.10-Ex.18) having tread patterns based on the tread pattern shown in FIG. 1, and a reference example tire (Ref.1) having a tread pattern which was the substantially same as that shown in FIG. 1 except that, as shown in FIG. 8, the outboard middle land region (e) was provided with inclined grooves (f) extending across the entire axial width of the land region (e), and inclined grooves (g) intersecting only with the respective inclined groove (f), and provided with no grooves corresponding to the second inclined grooves 17 and third inclined grooves 18.

Each test tire was tested for on-snow performance and steering stability on dry road surfaces in the same manner as described above.

The test results are shown in Table 2 by an index based on the reference example tire Ref.1 being 100, wherein the larger the numerical value, the better the performance.

TABLE 2

| Tire | Ref. 1 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| outboard middle land region (FIG. No.) | 8 | 2 | 2 | 2 | 2 | 2 | 2 | 2 | 2 | 2 |
| W1/TW | 0.30 | 0.30 | 0.25 | 0.28 | 0.32 | 0.35 | 0.30 | 0.30 | 0.30 | 0.30 |
| L1/W1 | — | 0.78 | 0.78 | 0.78 | 0.78 | 0.78 | 0.70 | 0.75 | 0.80 | 0.85 |
| on-show performance | 100 | 106 | 106 | 106 | 105 | 104 | 105 | 106 | 106 | 107 |
| steering stability | 100 | 103 | 101 | 102 | 103 | 102 | 103 | 103 | 102 | 101 |

From the test results, it was confirmed that the embodiment tires exhibited excellent on-snow performance and steering stability on dry road surfaces.

Comparative Test 3

Figure 9:
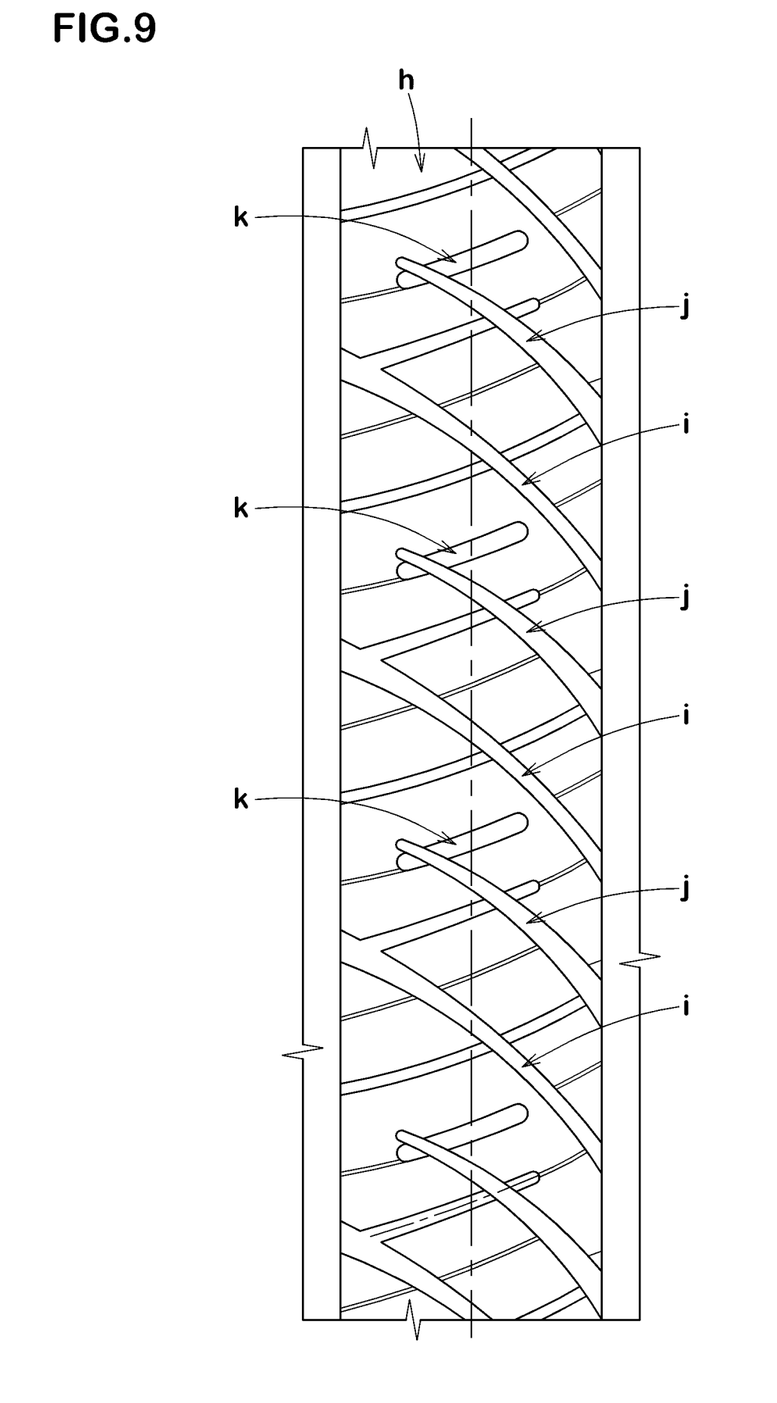
FIG. 9 is a top view of a part of the tread portion of a tire as a reference example 2.

Pneumatic tires of size 215/60R16 were experimentally manufactured as test tires including:

embodiment tires (Ex.19-Ex.27) having tread patterns based on the tread pattern shown in FIG. 1, and a reference example tire (Ref.2) having a tread pattern which was the substantially same as that shown in FIG. 1 except that, as shown in FIG. 9, the outboard middle land region (h) was provided with fifth inclined grooves (k) intersecting with respective second inclined grooves (j) and not connected to first inclined grooves (i).

Each test tire was tested for steering stability on dry road surfaces in the same manner as described above.

The test results are shown in Table 3 by an index based on the reference example tire Ref.2 being 100, wherein the larger the numerical value, the better the performance.

Further, each test tire was tested for wet performance as follows.

<Wet Performance>
wet performance of each test tire when the test car was running on a wet road surface was evaluated by the test driver.

The results are shown in Table 3 by an index based on the reference example tire Ref.2 being 100, wherein the larger the numerical value, the better the wet performance.

From the test results, it was confirmed that the embodiment tires exhibited excellent wet performance while maintaining steering stability on dry road surfaces.

DESCRIPTION OF THE REFERENCE SIGNS 2 tread portion
3 main groove
4 land portion
5 outboard shoulder main groove
7 crown main groove
11 outboard middle land region
16 first inclined groove
17 second inclined groove
19 fourth inclined groove
Te1 outboard tread edge
Te2 inboard tread edge

The invention claimed is:
1. A tire comprising:
a tread portion having an outboard tread edge and an inboard tread edge to be located outboard and inboard of a vehicle, respectively,
the tread portion provided, between the inboard tread edge and the outboard tread edge, with three main grooves,
the three main grooves extending continuously and circumferentially of the tire so that the tread portion is axially divided into four land regions,
the three main grooves including
an outboard shoulder main groove disposed closest to the outboard tread edge among the three main grooves, and
a crown main groove disposed adjacently to the outboard shoulder main groove on the inboard tread edge side of the outboard shoulder main groove, and
the four land regions including an outboard middle land region defined between the outboard shoulder main groove and the crown main groove,
wherein
the axial width of the outboard middle land region is the largest among the four land regions,
the outboard middle land region is provided with
first inclined grooves each inclined to a first direction with respect to the tire axial direction,

TABLE 3

| Tire | Ref.2 | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|---|
| outboard middle land region (FIG. No.) | 9 | 2 | 2 | 2 | 2 | 2 | 2 | 2 | 2 | 2 |
| W1/TW | 0.30 | 0.30 | 0.25 | 0.28 | 0.32 | 0.35 | 0.30 | 0.30 | 0.30 | 0.30 |
| angle θ3 (deg.) | 50 | 50 | 50 | 50 | 50 | 50 | 40 | 45 | 55 | 60 |
| steering stability | 100 | 102 | 101 | 102 | 103 | 103 | 101 | 102 | 102 | 101 |
| wet performance | 100 | 105 | 104 | 105 | 104 | 103 | 103 | 104 | 105 | 105 | second inclined grooves each inclined to the first direction with respect to the tire axial direction, and fourth inclined grooves inclined to a second direction with respect to the tire axial direction, wherein the second direction is opposite to the first direction, the first inclined grooves extend across the entire axial width of the outboard middle land region, the second inclined grooves extend from the crown main groove and are terminated to have ends within the outboard middle land region, an angle of each of the first inclined grooves with respect to the tire circumferential direction gradually increases from the crown main groove toward the outboard tread edge, an angle of each of the second inclined grooves with respect to the tire circumferential direction gradually increases from the crown main groove toward the outboard tread edge, and each of the fourth inclined grooves intersects one of the second inclined grooves and intersects one of the adjacent first inclined grooves at an axial position that is axially closer to the outboard shoulder main groove than the ends of the second inclined grooves, the outboard middle land region is further provided with:
third inclined grooves inclined to the second direction with respect to the tire axial direction, wherein each of the third inclined grooves extends from the outboard shoulder main groove, intersects with one of the first inclined grooves and then connects to one of the second inclined grooves; and fifth inclined grooves inclined to the second direction with respect to the tire axial direction, wherein each of the fifth inclined grooves extends to one of the first inclined grooves to terminate without extending thereacross, and extends to one of the second inclined grooves to terminate without extending thereacross.

2. The tire according to claim 1, wherein
the axial width W1 of the outboard middle land region is in a range from 0.25 to 0.35 times the tire tread width TW, and an axial distance L2 is a range from 0.05 to 0.20 times the axial width W1 of the outboard middle land region, wherein the axial distance L2 is from a position at which the widthwise center line of each of the fourth inclined grooves intersects one of the first inclined grooves to the groove edge of the outboard shoulder main groove.

3. The tire according to claim 1, wherein
the axial width W1 of the outboard middle land region is in a range from 0.25 to 0.35 times the tire tread width TW, and an axial length L1 of each of the second inclined grooves is in a range from 0.70 to 0.85 times the axial width W1 of the outboard middle land region.

4. The tire according to claim 1, wherein
the axial width W1 of the outboard middle land region is in a range from 0.25 to 0.35 times a tread width TW, and an angle θ3 between the widthwise center lines of the second inclined groove and the fifth inclined groove is a range from 45 to 55 degrees.

5. The tire according to claim 1, wherein
the first inclined grooves each have a groove width decreasing from the outboard shoulder main groove toward the crown main groove, the second inclined grooves each have a groove width decreasing from the crown main groove toward the outboard shoulder main groove, and each of the first inclined grooves and the second inclined grooves is curved so that the radius of curvature of the widthwise center line of the second inclined grooves is smaller than the radius of curvature of the widthwise center line of the first inclined grooves.

6. The tire according to claim 5, wherein each of the first inclined grooves comprises an outer part connected to the outboard shoulder main groove, and an inner part connected to the crown main groove, wherein the inner part has a smaller depth than the outer part.

7. The tire according to claim 5, wherein
the second inclined grooves have an opening width W5 to the crown main groove, the first inclined grooves have an opening width W4 to the outboard shoulder main groove, and the opening width W5 is larger than the opening width W4.

8. The tire according to claim 5, wherein the crown main groove is disposed between the tire equator and the inboard tread edge.

* * * * *